May 18, 1965   L. J. CARPEZZI   3,184,205
VERTICALLY ADJUSTABLE DOLLY
Filed March 26, 1964
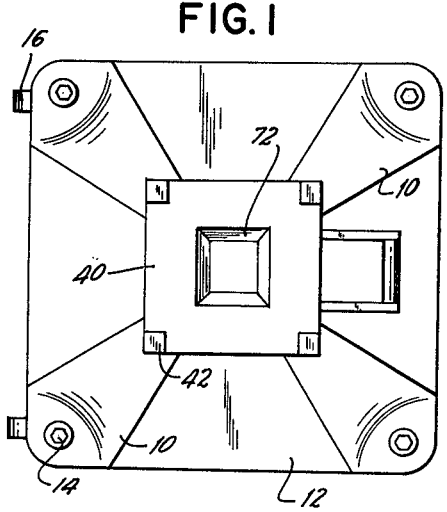
FIG. 1
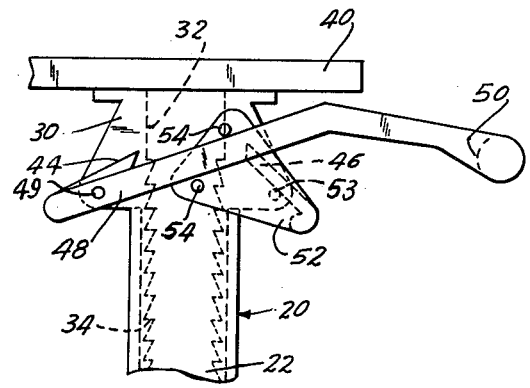
FIG. 3
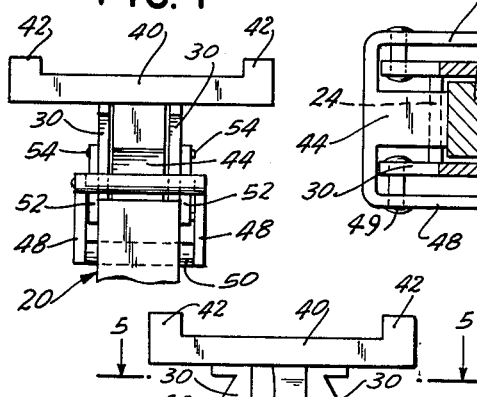
FIG. 4
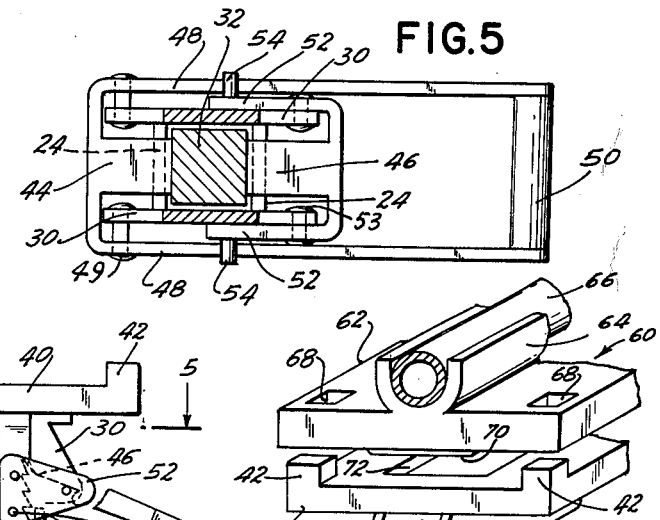
FIG. 5
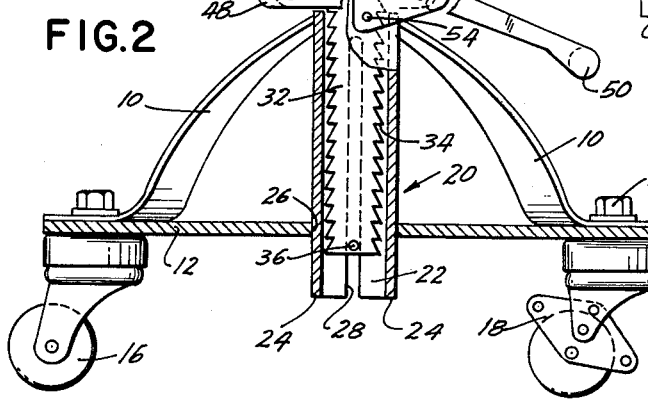
FIG. 2
FIG. 6
INVENTOR.
LEON JOSEPH CARPEZZI
BY
ATTORNEY

United States Patent Office 3,184,205
Patented May 18, 1965

3,184,205
VERTICALLY ADJUSTABLE DOLLY
Leo Joseph Carpezzi, 3817 Fort Hamilton Parkway, New York, N.Y.
Filed Mar. 26, 1964, Ser. No. 354,913
15 Claims. (Cl. 248—352)

The present invention relates to a horizontally-movable and vertically-adjustable dolly, and is an extension of and improvement over my invention described and claimed in my co-pending application Serial No. 130,888, filed August 11, 1961, now U.S. Patent No. 3,137,512, dated June 16, 1964.

In my said co-pending application, I have described and claimed a dolly supported on rollers and having a vertically adjustable article-supporting platform, of a type having its greatest usefulness in the safe support of the whole or part of a motor vehicle body in elevated relation to a supporting surface, as for the purposes of repair of such motor vehicles, and to enable such body to be moved about, while so supported. As explained in my said co-pending application, such dolly may be used to support, in adjustably elevated relation, one end of a motor vehicle by resting a frame member or beam thereof directly on the flat vertically adjustable platform of the dolly, after said end is first jacked up; or, the entire body may be supported on a plurality of such dollies disposed below and supporting directly on their flat platforms three or more points of the vehicle frame.

Such vertically adjustable dolly, as broadly conceived in my said co-pending application, consists of a stand having a relatively wide base and mounted on rollers, supporting a vertically-arranged sleeve or sheath in which is vertically reciprocally held a shaft having a flat article-supporting platform at its upper end, above the sleeve. The shaft is provided with a rack along one vertical edge thereof; such rack having downwardly sloping teeth engageable by a pawl supported in the upper end portion of the sleeve, to inhibit downward movement of the rod within the sleeve without manual release of the pawl, but permitting free upward movement of the shaft, without any need for pawl release.

While the above described dolly is generally efficient and effective for its purposes, it has certain shortcomings. Thus, for instance, the vertically reciprocable shaft is not sufficiently firmly and steadily held within the sleeve and has a tendency to tilt slightly and to be shaky and wobbly, creating a risk of toppling of the dolly when it is moved and strikes a snag or if the body resting on it is tugged or pushed in the course of repair; the initial tilt and the wobbling or shaking providing the momentum for the eventual toppling. Also, as heretofore formed, the dolly could be effectively used only to directly support, by its flat platform, the flat underside of a frame member of the body of the supported vehicle. It could not, however, be effectively used for the indirect support of the body, as by resting such body on a cylindrical rod or tube disposed under its frame within the ends of the rod or tube supported on two such dollies, because of the risk of the movement of such cross-piece on the flat dolly platform surface to make such support sufficiently firm and steady for many purposes.

It is the object of the present invention, therefore, to provide a vertically adjustable dolly, of the character described, which is more erect and more steady and firm and less apt to shake and wobble and overturn as a result.

It is another object of the present invention to provide a vertically adjustable dolly, of the character described, which may be manipulated for elevating and lowering by an operator by the use of only one hand, leaving the other hand free for other purposes.

It is also an object of the present invention to provide a vertically adjustable dolly, of the character described, which may be optionally used to directly support a vehicle body by its frame structure and also to indirectly support such vehicle body by supporting the ends of a rod or tube underlying a body frame on two such dollies It is a further object of the present invention to provide a dolly, of the character described, which is easy and convenient to use, which is strong and sturdy and durable, and which may be produced at relatively little, if any, increase in cost over the dolly of my co-pending application.

In the drawings:

FIG. 1 is a top plan view of one embodiment of a dolly of the present invention;

FIG. 2 is an elevational and partly sectional view of the same, with the article supporting platform shown as disposed in supported position;

FIG. 3 is a fragmentary, elevational view of the same showing the supporting platform in released position;

FIG. 4 is a fragmentary, elevational view of the dolly taken at a 90° angle to FIG. 2;

FIG. 5 is a section taken on line 5—5 of FIG. 2; and

FIG. 6 is a fragmentary, exploded, perspective view showing the dolly of the present invention, with an adaptor converting it for indirect support of a vehicle body, as by a cylindrical member.

Generally stated, the present invention is directed to the provision of a more steady and firm dolly by providing its vertically adjustable member with pawl-engaging racks, and pawls along two opposed sides thereof, and with means for simultaneously, automatically engaging a pawl with both pawl-engaging racks for supporting the vertically adjustable shaft in elevated position, and for simultaneously releasing the two pawls, by unitary means operable with one hand, for permitting the lowering of the shaft to lowest position. The invention also provides an adaptor removably but firmly and safely interengageable with the platform of the dolly and having means for cradling and holding a cylindrical rod in fixed, stable position thereon.

Referring now, in greater detail, to the embodiment of the invention illustrated in the drawings, the same is shown to comprise a preferably rectangular stand, wider at the bottom and narrower at the top which may be formed of a plurality, such as 4, of upwardly convergent legs 10 which are interengaged for bracing, at their bottom ends, in any desired manner, as by the baseboard 12 to which the lower end of each leg 10 may be secured, as by bolts and nuts 14, the former of which may comprise part of the structure of a roller 16 which is thus simultaneously secured to the underside of the baseboard at each corner thereof. One or more of the rollers 16 may be provided with releasable braking means, such as indicated at 18, to thereby render the stand stationary when desired. The upper end of the legs 10 are secured to a sleeve or sheath, generally designated as 20, which is supported in upright position between them. The sleeve 20 is preferably of rectangular cross section and is formed of pairs of opposed walls, 22, and 24, respectively. The sleeve 20 is of a length to extend above the upper end of the legs 10 and a short distance below the baseboard 14, as through a suitable opening, 26, provided therein, and may be secured to the baseboard, if desired, in any suitable manner.

One pair of the opposed sleeve walls, as 22, may have a vertically extending guide slot 28 formed therein, extending upwardly thereinto from its bottom edge. Such pair of opposed walls may also be provided on the portions thereof projecting above the legs 10 with laterally extending wings or lugs 30, which may preferably taper inwardly and upwardly. The other pair of opposed walls 24 may terminate short of the lower edge of wings 30 in walls 22, to provide an open-sided space at the top of sleeve 20, between walls 22.

Disposed vertically slidably within sleeve 20 is a shaft 32, which is of a cross section corresponding to the cross section of the sleeve 20 and may be formed to fit relatively closely therewithin. The sides of the shaft 32 facing the pair of walls 24 are each provided with a rack 34, whose teeth preferably are in register and are formed with their upper faces sloping downwardly and their lower faces disposed in substantially horizontal position. The shaft 32 is provided on its sides facing wall 22, adjacent their lower ends with guide pins 36, that extend into and are guided within the adjacent guide slots 28. The shaft 32 has secured to its upper end, in any suitable manner, a horizontally disposed, preferably rectangular platform 40, having along two opposed edges thereof, or, preferably at each of its four corners, as illustrated, upwardly extending guard projections 42. The platform 40 may be of lesser area than the bottom or baseboard 12 of the stand; but of sufficient area to support thereon between the guard projection on at least two of its sides, the flat bottom face of a vehicle frame member, or other article or structure intended to be supported on the dolly.

Pivotally supported at their bottom edges between each pair of wings 30, one to each side of the sleeve 20, are a pair of pawls, 44 and 46, respectively. The pawls 44 and 46 are each arranged to have its upper end engageable with the teeth of the adjacent rack 34, to maintain the shaft 32 and platform 40 supported thereon in any desired adjusted elevated position. Manually operated means are provided for releasing pawls 44 and 46 from the racks 34, when desired to permit gravitational lowering of the shaft 32 and platform 40 to any lowered position desired, until the latter rests on the upper edges of sleeve walls 22. Preferably the pawl releasing means may be unitary, so that both of the pawls 44 and 46 may be simultaneously disengaged from their adjacent racks 34, to thereby permit such pawl releasing operation to be performed by the operator with the use of only one hand leaving the other hand free for whatever other operation may be required of him. To that end, one of the pawls, as 44, may be provided, at its bottom, with preferably integrally formed arms 48, which are preferably set at an acute angle to the pawl and so arranged that when the arms 48 are in approximately horizontal position, the pawl is in engagement with the adjacent rack 34. The arms 48 of pawl 44 may serve to receive the pivot pins 49, by which the pawl is pivoted on the adjacent wings 30, as illustrated, and they extend inwardly towards the sleeve 20 and project beyond it to the other side thereof, where thy may be slightly downwardly offset and interconnected at their ends, as by a handle 50. The ends of the arms 48 as well as the handle 50 may be formed to be of substantial weight, as by thickening, so as to overbalance the other ends of the arms and normally dispose the pawl 44 in inwardly tilted, rack engaging position.

The other of the pawls 46 may likewise be provided with arms 52 connected to its lower end, at an acute angle, thereto, by which it may be pivoted, as at 53, on the adjacent wings 30 and which extend inwardly towards the opposed pawl 44. The arms 52 may preferably be disposed between the walls 22 of the sleeve 30 and the arms 48 of pawl 44 and may extend toward pawl 44, to terminate, preferably, approximately opposite the guide slots 28. The end of the arms 52 may each be freely and slidably interengaged by the adjacent arm 48 at a point approximately opposite the guide slots 28 of the sleeve walls 22. Such interengagement may be effected in any desired manner, as by having the ends of arms 52 of substantial width and by providing in such end vertically spaced pins 54 that receive between them an arm 48, to be engaged by the upper and lower edges of such arm, for movement therewith when the latter is moved upwardly or downwardly.

It will be readily apparent that normally, the weight of the end of the arms 48 and their connecting handle 50 will lower the handle end of the arm 48 and raise its other end to tilt pawl 44 into engagement with adjacent rack 34. The downward pressure of the arms 48 will press against the lowermost of the pins 54 in the arms 52, to thereby lower the arms ends of arms 52 and raise their other ends and tilt pawl 46, simultaneously with pawl 44, into engagement with its adjacent rack 34. Because of the shape of the teeth of the rack 34, the pawls 44 and 46 will slide freely over the upper faces of such teeth, so that the shaft 32 and platform 40 may be readily and freely elevated within the sleeve 22, without interference by the pawl, and will be retained by such pawls against downward displacement from elevated position, by their engagement of the bottom faces of the rack teeth, until such pawls are disengaged from the rack by the elevation of the handle 50.

It will also be readily apparent that, as described above, the dolly of the present invention is adaptable for directly supporting on its platform 40, the flat underside of a vehicle frame member, the projections 42 and corners of the platform serving as guards to prevent the slipping off of the frame member from the platform. It will likewise be apparent that because of the provision of rocks 34 on two sides of the shaft 32, whose teeth are in register and are simultaneouhly engageable by pawls 44 and 46, the shafts 42 will not only be more safely held in adjusted, elevated position but will be held in such position more erectly, more firmly and more steadily against rocking and swaying, to thereby reduce the tendency of the dolly to topple.

To provide for the indirect support of articles or structures by a pair or pairs of dollies of this invention, each dolly may be provided with an adaptor, which may be supported thereon to receive and hold in fixed position, the end of a cylindrical rod or tube on which such article or structure, as a vehicle body, may be rested. In the illustrated embodiment of this invention such adaptor, generally designated as 60, comprises a rectangular plate 62, having preferably built up on its upper surface, a trough 64, within which may be received and supported the end of a cylindrical rod or tube 66. The bottom of the trough may be circular and preferably of a radius slightly larger than the radius of the cylindrical body being received therein, and for safety, its sides may be substantially parallel and may preferably be of a height equal at least to the diameter of such cylinder. The adaptor 60 is supportable on the platform 40 of the dolly, and cooperating means are provided on the dolly platform 40 and the adaptor 60 for interengaging them against lateral shifting relative to one another. Such means may comprise openings 68, formed in the corners of the plate 62, which openings are adapted to fit and engage over the guard projections 42 of the platform 40. Additionally, the platform 40 may be provided with a preferably polygonal, such as rectangular recess, 72, at its center, preferably formed with inwardly sloping sides, as illustrated, and the underside of the plate 62 may be provided with a correspondingly shaped stud or projection 70, adapted to fit snugly within the recess 72 when guard projections 42 are fitted into the opening 68.

It will be readily apparent that such adaptor 60 may be quickly and easily fitted on the platform 40 and that, when so fitted, it will be held firmly and rigidly in place thereon against lateral displacement, and be highly suitable to support, in the trough 64, the end of a cylindrical rod or tube in firm, immovable position therein. It will also be apparent that such adaptor may be quickly and easily removed from the dolly.

This completes the description of the improved vertically adjustable dolly of the present invention. It will be readily apparent that such dolly is of increased steadiness and firmness, being less likely to have its platform shake or wobble when in elevated position, and therefore, less likely to topple due to inadvertence. It will also be apparent that the dolly of the present invention may be manipulated with only one hand leaving the operator's other hand free to perform other tasks that may be required while adjustment of the dolly is being effected. It will likewise be apparent that the dolly of the present invention may serve as a direct support for articles or structures and that it may also be adapted, with great ease and convenience, for indirectly supporting such articles or structures by supporting the ends of a cylindrical rod or tube on which such articles or structures rest.

It will be further apparent that numerous modifications and variations in the vertically adjustable dolly of the present invention may be made by anyone skilled in the art, in accordance with the principles of the invention hereinabove set forth and without the exercise of any inventive ingenuity. I desire, therefore, to be protected for any and all such modifications and variations that may be made within the spirit of the invention and the scope of the claims hereto appended.

What I claim is:

1. A vertically-adjustable dolly, of the character described, comprising an upright stand wider at its bottom and tapering toward its upper end, a sleeve supported on said stand in upright position at a midpoint thereof, a shaft disposed within said sleeve for vertical reciprocal movement therein, said shaft projecting above said sleeve and having a horizontally-disposed platform secured on its projecting end, said platform being of an area less than the area of the lower end of said stand, said shaft having a longitudinally-disposed toothed rack on each of the opposed sides thereof, the teeth of each said rack each having a downwardly-sloping upper face, a pawl uprightly tiltably supported by its lower end at an upper portion of said sleeve adjacent each of said racks in position for having its other end move in and out of engagement with said adjacent rack, means normally urging each of said pawls into engagement with the rock adjacent thereto, and manually-operable means for simultaneously moving both of said pawls out of engagement with the rack adjacent thereto.

2. The dolly of claim 1, wherein said manually-operable means for simultaneously moving both of said pawls out of engagement with the rack adjacent thereto comprises an arm connected to the lower end of each of said pawls at an acute angle thereto, each said arm extending in the direction of the other, the arm of one of said pawls extending past said sleeve, and means slidably interengaging said arm of said one pawl with the arm of the other of said pawls opposite substantially the center of said sleeve for simultaneous vertical reciprocal movement.

3. The dolly of claim 2, wherein a pair of said arms are provided on each of said pawls, one to each side of said sleeve, and wherein said arms extending past said sleeve are interconnected by handle means.

4. The dolly of claim 3, wherein said pawls and said arms are arranged to have said arms in substantially horizontal position when said pawls are tilted into engagement with said racks, and wherein said arms extending past said sleeve and said handle connecting them are weighted to normally maintain said arms of said pawls in said horizontal position.

5. The dolly of claim 1, wherein the upper surface of said platform is provided with guard projections on opposed sides thereof.

6. A dolly, of the character described, comprising, the combination with an upright stand, an upright sleeve supported on said stand at a midpoint thereof, said sleeve projecting above said stand, a shaft disposed within said sleeve for vertical reciprocal movement therein, said shaft carrying a flat, horizontally-disposed platform at its upper end projecting from said sleeve, an adaptor means for substantially, immovably supporting the end of a cylindrical rod on said platform comprising a plate mountable on said platform, said plate having a trough provided on its upper surface adapted to receive and hold said end of said cylindrical rod, and cooperating means on said platform and said plate interengaging said platform and said plate against relative lateral displacement.

7. The dolly of claim 6, wherein said cooperating means include guard projections on the upper surface of said platform along marginal edge portions thereof and correspondingly-positioned openings formed in said plate arranged to fit over said guard projections.

8. The dolly of claim 6, wherein said cooperating means include a polygonal recess formed in a midpoint of said platform and a correspondingly-shaped stud formed on the underside of said plate and adapted to fit within said recess.

9. The dolly of claim 6, wherein said trough is formed on top of said plate.

10. A vertically adjustable dolly, of the character described, comprising an upright stand, wider at its bottom and tapering towards its upper end, a sleeve supported in upright position on said stand and projecting thereabove, a shaft disposed within said sleeve for vertical, reciprocal movement therein, said shaft supporting a horizontally-disposed platform on its upper end, said shaft having a longitudinally-disposed toothed rack on each of two opposed sides thereof, the teeth of said racks having downwardly-sloping upper faces, said sleeve having two opposed wall portions extending above two opposed wall portions between them, the upper edges of said extending portions adapted to support said platform in lowermost position, said racks facing said second-named pair of opposed wall portions, said first-named pair of opposed wall portions having lateral extensions at their upper ends, a pawl uprightly, tiltably supported by a lower end portion between a pair of said lateral extensions in position for having its upper end moved in and out of engagement with the adjacent rack, the upper ends of said pawls disposed below the upper edges of said upwardly-extending wall portions, means normally urging each of said pawls into engagement with the rack adjacent thereto and manually operable means for simultaneously moving each of said pawls out of engagement with the rack adjacent thereto.

11. The dolly of claim 10, wherein said manually operable means for simultaneously moving each of said pawls out of engagement with the rack adjacent thereto comprises an arm connected to the lower end of each of said pawls at an acute angle thereto, each said arm extending in the direction of the other, and vertically reciprocable handle means connected to one of said arms and slidably engaging the other of said arms for the simultaneous movement of said pawls out of engagement with said racks.

12. The dolly of claim 10, wherein said manually operable means for simultaneously moving each of said pawls out of engagement with the rack adjacent thereto comprises an arm connected to the lower end of each of said pawls at each side thereof, at an acute angle thereto, said pawls pivotally supported by said arms on said lateral extension in position to have the arms of each said pawl extending in the direction of the other, the arms of one of said pawls extending past said sleeve and connected at their ends to form a handle, the arms of the other of said pawls terminating at approximately a midpoint of said first-named opposed wall portions, and means on the arms of said other pawl slidably engaging the upper and lower edges of the arms of said one pawl for simultaneous movement upwardly and downwardly therewith.

13. The combination of a vertically-adjustable dolly comprising an upright stand, wider at its bottom and tapering towards its upper end, a sleeve supported in upright position on said stand and projecting thereabove, a shaft disposed within said sleeve for vertical, reciprocal movement therein, said shaft supporting a horizontally-disposed platform on its upper end, said platform having guard projections on its upper surface along marginal edge portions thereof, said shaft having a longitudinally-disposed toothed rack on each of two opposed sides thereof, the teeth of said racks having downwardly-sloping upper faces, said sleeve having two opposed wall portions extending above two opposed wall portions between them, the upper edges of said extending portions adapted to support said platform in lowermost position, said racks facing said second-named pair of opposed wall portion, said first-named pair of opposed wall portions having lateral extensions at their upper ends, a pawl uprightly, tiltably supported by a lower end portion between a pair of said lateral extensions in position for having its upper end moved in and out of engagement with the adjacent rack, the upper ends of said pawls disposed below the upper edges of said upwardly-extending wall portions, means normally urging each of said pawls into engagement with the rack adjacent thereto and manually operable means for simultaneously moving each of said pawls out of engagement with the rack adjacent thereto, with attachable means for substantially and movably supporting the end of a cylindrical rod on said platform, said attachable means comprising a plate mounted on said platform, said plate having openings formed therein positioned correspondingly to said guard projections and adapted to fit thereover, and a trough provided on its upper surface adapted to receive and hold said end on said cylindrical rod.

14. The dolly of claim 13, wherein said platform is formed with a polygonal recess in its upper surface and said plate is provided with a correspondingly shaped stud formed on the underside thereof.

15. The dolly of claim 13, wherein said trough is formed on top of said plate.

References Cited by the Examiner
UNITED STATES PATENTS

| | | | |
|---|---|---|---|
| 829,333 | 8/06 | Hampson | 248—352 |
| 917,789 | 4/09 | Oliver | 254—109 |
| 1,364,433 | 1/21 | Gilcrease | 248—352 |
| 1,524,913 | 2/25 | Dahl | 248—352 |
| 1,794,052 | 2/31 | Anderson et al. | 248—352 |
| 1,810,726 | 6/31 | Pierce | 248—352 |
| 1,894,293 | 1/33 | Green | 248—352 |
| 2,343,050 | 2/44 | Fischer | 248—177 |
| 2,536,170 | 1/51 | Guest | 248—177 |
| 2,558,401 | 6/51 | Voigt | 254—109 |
| 2,838,278 | 6/58 | Johnsen | 248—178 |
| 3,137,512 | 6/64 | Carpezzi | 280—35 |

CLAUDE A. LE ROY, *Primary Examiner.*